United States Patent [19]

Alexander

[11] Patent Number: 5,132,021

[45] Date of Patent: * Jul. 21, 1992

[54] IN SITU TREATMENT OF WASTE WATER TO PREVENT GROUND WATER CONTAMINATION

[75] Inventor: William Alexander, Evanston, Ill.

[73] Assignee: American Colloid Company, Arlington Heights, Ill.

[*] Notice: The portion of the term of this patent subsequent to Aug. 27, 2008 has been disclaimed.

[21] Appl. No.: 689,367

[22] Filed: Apr. 22, 1991

Related U.S. Application Data

[63] Continuation-in-part of Ser. No. 392,775, Aug. 11, 1989, Pat. No. 5,043,076.

[51] Int. Cl.$^5$ .............................. B01D 15/04
[52] U.S. Cl. .................... 210/679; 210/747; 210/170; 210/283; 210/484; 405/55; 405/128
[58] Field of Search ............... 210/660, 679, 747, 170, 210/282, 283, 291, 484; 405/43–45, 50, 55, 57, 58, 128, 129

[56] References Cited

U.S. PATENT DOCUMENTS 4,473,477  9/1984  Beall .................................. 210/747
4,840,734  6/1989  Johnson .............................. 210/484

Primary Examiner—Ivars Cintins
Attorney, Agent, or Firm—Marshall, O'Toole, Gerstein, Murray & Bicknell

[57] ABSTRACT

An article of manufacture and method for holding and treating water contaminated with one or more water-soluble contaminants to substantially prevent the contaminants from seeping into ground water supplies disposed below a water hold area. The article of manufacture and method include the use of a water-holding material, e.g., a water-swellable clay, such as bentonite, for reducing the permeation of the contaminated water into the soil, and a treatment layer, disposed beneath the water-holding material, containing a material capable of adsorbing, absorbing, ion-exchanging, neutralizing or reacting with one or more water-soluble contaminants within the water for removing a substantial portion of the contaminants from the water so that the portion of the held water that permeates the water-holding layer, will be rendered substantially less contaminated.

7 Claims, 1 Drawing Sheet

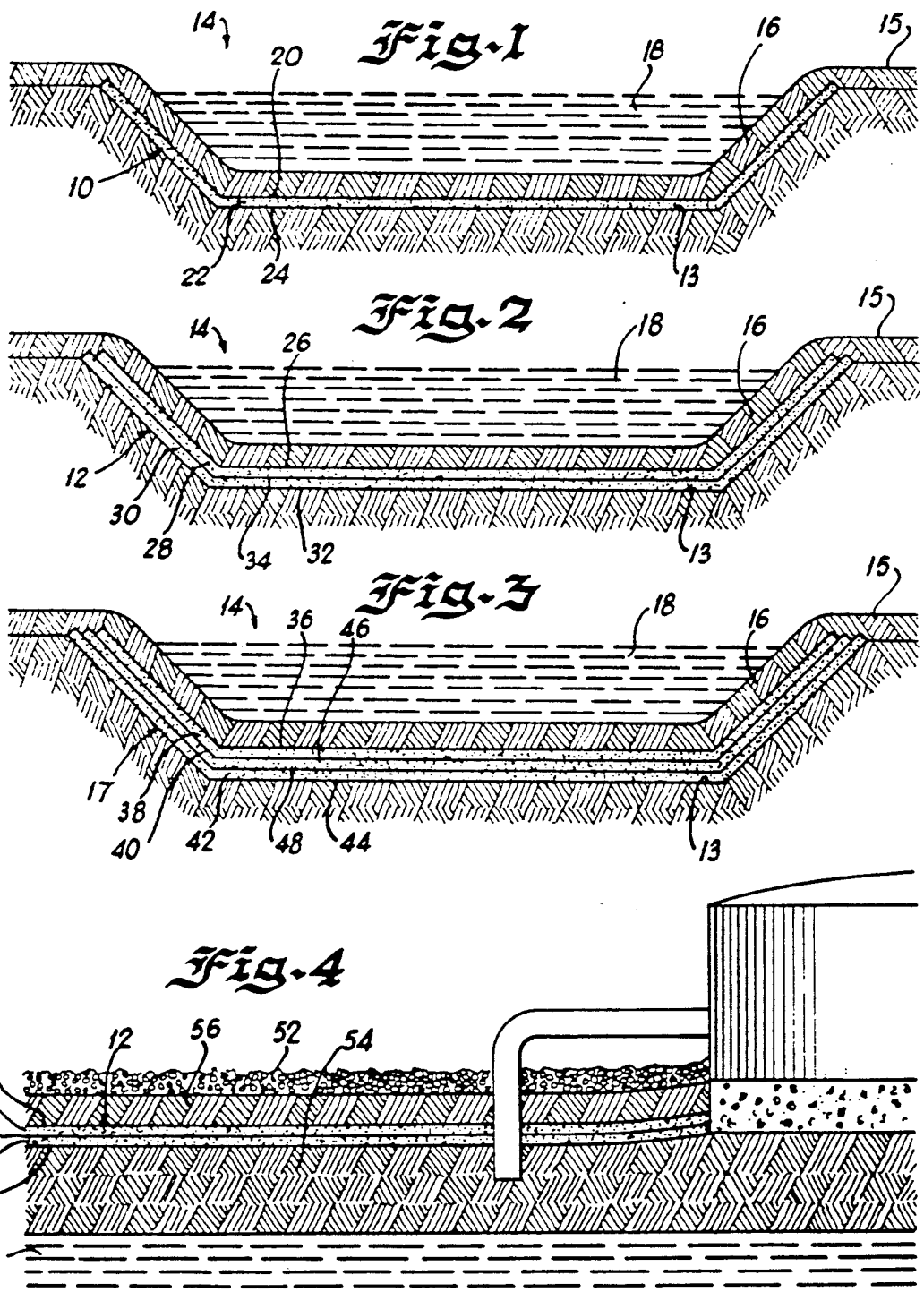

IN SITU TREATMENT OF WASTE WATER TO PREVENT GROUND WATER CONTAMINATION

CROSS REFERENCE TO RELATED APPLICATION

This is a continuation-in-part of application Ser. No. 07/392,775 filed on Aug. 11, 1989, now U.S. Pat. No. 5,043,076.

FIELD OF THE INVENTION

The present invention is directed to a single layer, or multilayer article of manufacture useful for the containment of water over a predetermined land area and for the treatment of any water that permeates the containment area so that water permeating a water-holding layer of the article of manufacture is simultaneously treated for removal or neutralization of one or more water-soluble contaminants.

More particularly, the present invention is directed to an article of manufacture including a layer of water-holding material, for example, a water-swellable clay layer, or a water-impermeable sheet material, capable of retaining water according to specifications, e.g., so that $1 \times 10^{-7}$ cm/sec or less water permeates the layer. In addition to the water swellable clay water retention layer, one or more other components can be homogeneously mixed into the water-swellable clay layer for treatment of the water as it permeates the clay layer, or one or more additional layers of treatment material can be disposed below the water-retaining layer to treat the water that permeates the clay layer for removal or neutralization of one or more water-soluble contaminants before the soil-permeating water reaches ground water supplies.

BACKGROUND OF THE INVENTION AND PRIOR ART

Various polymers, swellable clays, and articles of manufacture have been applied to the surface of soil to provide a waterproofing layer to prevent substantial penetration of water and hazardous or toxic materials into the earth in order to provide lagoons, ponds and hazardous or toxic waste containment areas. Water-swellable clays, such as bentonite, have been applied directly to the soil surface and impacted in place, as disclosed in this assignee's prior U.S. Pat. No. 3,986,365. In addition, many different multi-layered articles of manufacture containing a water-swellable clay, such as bentonite, have been manufactured by adhesively securing the water-swellable clay to a flexible sheet material for application to the soil surface in abutting or overlapping relation to adjoining multi-layered articles. Examples of flexible sheet materials containing adhesively secured water-swellable clays are found in the following U.S. Patents: Clem U.S. Pat. No. 4,467,015; Clem U.S. Pat. No. 4,501,788; McGroarty et al. U.S. Pat. No. 4,693,923; Harriett U.S. Pat. No. 4,656,062; and Harriett U.S. Pat. No. 4,787,780.

Another waterproofing barrier disclosed in Blais U.S. Pat. No. 4,344,722 is constructed in the field by applying a first flexible, water-permeable fabric layer, overlaying a thickness of powdered or granular water-swellable clay material and applying an upper or overlayer of the same flexible, water-permeable fabric thereover. Other patents disclosing the use of substantially water-impermeable layers for protecting a soil surface include British Patent Specification 1,059,363; British Patent Specification 1,029,513 and British Patent Specification 1,129,840.

As set forth in this assignee's U.S. Pat. No 4,094,382, water-soluble industrial wastes, particularly at relatively high concentrations, can substantially increase the water-permeability of water-swellable clays, such as bentonite. Thus, when the water barrier characteristics of a water-swellable clay is most important—that is, when used to contain a substantially contaminated pond, lagoon or hazardous or toxic waste containment area, often times the clay allows seepage of a substantial amount of the contaminated solution into the soil, sometimes resulting in the contamination of valuable ground water supplies.

Attempts have been made to prevent the seepage of contaminated water through the water-swellable clay so that the contaminants would not find their way into ground water supplies. An example of an attempt to improve the water barrier characteristics of water-swellable clays when subjected to a head of water contaminated with water-soluble inorganic industrial contaminants include this assignee's U.S. Pat. No. 4,084,382. An article or process for preventing contamination of ground water supplies has been in need for many decades and is becoming more and more critical as time passes due to the even smaller supply of potable water in many areas of the United States, and throughout the world.

While others have attempted to prevent the seepage of contaminated water through the water-swellable clay material or layer as a means of protecting the ground water supply, quite surprisingly, applicant has found that the ground water is protected from contamination in a very unique and unobvious manner by an in situ in-ground treatment step, by treating the contaminated water that enters or passes through the water-holding material, e.g., a water-swellable clay layer with one or more materials capable of absorbing, adsorbing, ion-exchanging, neutralizing or reacting with the water-soluble contaminant(s). To achieve the full advantage of the present invention, the contaminant treating material should be dispersed above the soil or containment area floor as a separate layer and not admixed with the soil in order to make sure that the contaminants will be treated and not find a circuitous path through the contaminant-treating material to the ground water without being completely decontaminated.

SUMMARY OF THE INVENTION

In brief, the present invention is directed to an article of manufacture and method for holding and treating water contaminated with one or more water-soluble contaminants to substantially prevent the contaminants from seeping into ground water supplies disposed below a water holding area. The article of manufacture and method of the present invention include the use of a water-holding material, e.g., a water-swellable clay, such as bentonite, for reducing the permeation of the contaminated water into the soil, and an in-ground treatment layer, disposed below the water-holding material, containing a material capable of adsorbing, absorbing, ion-exchanging, neutralizing or reacting with one or more water-soluble contaminants within the water for removing a substantial portion of the contaminants from the water so that the portion of the held water that permeates the water-holding layer will be rendered substantially less contaminated. The in-ground treatment layer should be substantially free of soil and other materials that would allow a free path of travel for the contaminated water.

Accordingly, one aspect of the present invention is to provide a new and improved article of manufacture and method for reducing the permeation of water-soluble contaminants into the ground water supplies.

Another aspect of the present invention is to provide a new and improved article of manufacture and method for reducing both the amount of water permeating a soil and the amount of contaminants in the permeating water to improve the quality of ground water supplies.

Still another aspect of the present invention it to provide a new and improved device and method for removing contaminants from a water supply by first substantially slowing the permeation of water into a soil surface with a water-holding material, such as a water-swellable clay material, e.g., bentonite clay, and thereafter treating only the water permeating the water-holding material with a contaminant-treating material disposed above the soil, and not in admixture with the soil, to prevent contact of the soil with the contaminant(s) to remove one or more contaminants from the water.

Another aspect of the present invention is to provide a new and improved water-holding material capable of limiting the flow of water therethrough, and treating contaminants in the water that does pass through a water-holding material, wherein the water-holding material can be admixed with the contaminant-treating material as a single layer above (not mixed with) the soil; or the water-holding material can be a separate layer above a contaminant-treating material layer disposed above, and not in admixture with the soil.

A further aspect of the present invention is to provide a new and improved article of manufacture and method for holding contaminated water in a holding pond or lagoon, and preventing the contaminants from permeating the soil by containing the water with a non-biodegradable water-holding material, such as by contacting the water with a water-swellable clay, to substantially slow the penetration rate of the contaminated water, and contacting the water that penetrates the water-holding material with an adsorbent; absorbent; ion-exchange material or a reactant for one or more inorganic or organic contaminants in the water to substantially reduce the amount of contaminants reaching ground water supplies.

The above other other aspects and advantages of the present invention will become apparent from the following detailed description of the present invention taken in conjunction with the drawings.

BRIEF DESCRIPTION OF THE DRAWINGS

FIG. 1 is a side view of one embodiment of the article of manufacture of the present invention installed over a soil surface for holding contaminated water in a holding pond or lagoon to prevent ground water contamination;

FIG. 2 is a view similar to FIG. 1 showing another embodiment of the article of the present invention including separate layers of a water-swellable clay and a lower, contaminant removing material, such as a zeolite or an organophilic clay;

FIG. 3 is a view similar to FIG. 2 showing another embodiment of the article of the present invention including a layer of a water-holding material, such as bentonite and two contaminant-removing layers disposed below the water-holding material; and FIG. 4 is a side view of the article of FIG. 2 installed in a tank farm environment to prevent ground water contamination in case of a tank leak.

DETAILED DESCRIPTION OF THE PREFERRED EMBODIMENTS

In accordance with the present invention, an article of manufacture made in accordance with the present invention includes a water-holding layer, such as a layer of a water-swellable clay, such as bentonite, for the purpose of holding a quantity of water within an earthen holding area for containing a body of water containing one or more water-soluble contaminants. The article of manufacture, in addition to providing the water barrier characteristics, also provides a material capable of treating one or more of the water-soluble contaminants to remove or neutralize one or more contaminants.

In accordance with an important feature of the present invention, the article and method of the present invention unexpectedly provide the capability of neutralizing or removing the contaminants only from that portion of the held water that permeates the water-holding layer so that only that portion of the held water that presents a problem, that is—only the water that permeates the water-holding layer, is treated for removal of the undesirable contaminants.

The water-holding layer of the article and method of the present invention can be any material capable of holding a head of water at a desired permeation rate. Environmental specifications generally call for a material having a water permeation rate of $1 \times 10^{-7}$ cm/sec or less. Suitable materials include sheet materials and fabrics having the desired permeability. Suitable fabrics include woven and non-woven permeable and non-permeable fabrics made from polypropylene, polyesters, nylon, propylene-ethylene copolymers, polypropylene-polyamide copolymers, and the like. The geotextile are preferred for their bacteriological and chemical resistance. The thickness of the fabric is not important and such fabrics generally are available in thicknesses of 3 to about 30 mils.

Other suitable water-holding materials include a layer of water-swellable clay, such as the bentonite compositions disclosed in this assignee's prior U.S. Pat. Nos. 4,810,573; 4,733,989; 4,656,062; 4,534,926 and 4,534,925, which patents are hereby incorporated by reference. Preferred is a layer of a water-swellable colloidal clay, such a bentonite.

Preferably, the water-swellable clay that can be utilized as the water barrier material of the articles of the present invention is any water-swellable clay which will hydrate in the presence of water, i.e., will swell in the presence of water. In accordance with one important embodiment of the present invention, the clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as magnesium and iron. There are cases wherein a montmorillonite predominant in calcium ions can be converted to a high swelling sodium variety through a well known process called "peptizing". The clay utilized in this invention may be one or more peptized bentonites. The clay may also be any member of the dioctahedral or trioctahedral smectite group or mixtures thereof. Examples are Beidellite, Nontronite, Hectorite and Saponite. To achieve the full advantage of the present invention, the colloidal clay, e.g., bentonite, generally is finely divided as known for use in water barrier panels and the like, i.e., 150 to 350 mesh.

In accordance with an important feature of the present invention, in addition to the water barrier characteristics, the articles of the present invention further include the capability of neutralizing or removing one or more water-soluble contaminants from the water that permeates the water-holding layer to clarify the water that passes through the soil and into any ground water supply that might be present beneath the soil surface.

Some of the most prevalent contaminants found in waste waters contained in ponds, lagoons and other water-holding areas, particularly where these water-holding areas include industrial waste waters, are heavy metal ions and water-soluble organic materials. Water-insoluble organic materials, particularly those resulting from industrial waste, are easily removed at some point prior to the industrial waste water being placed in a water-holding area. It is well known in the prior art that natural and synthetic zeolites are capable of removing a substantial portion of the heavy metal ions from a waste water solution and that organophilic clays are capable of removing water-soluble organic materials from solution. However, the prior art suggests that removal of these materials from waste water streams should be done on stream, treating the entirety of the waste water stream in order to remove these materials. Because of the massive amounts of industrial waste water treated when treated on stream, the treatment material, e.g., zeolite and/or organophilic clay, must be frequently replaced because of the heavy volumes of waste water stream that passes through the zeolites or passes through the organophilic clays in order to clarify these waste water streams.

In accordance with an important feature of the present invention, it has been found that by combining a natural or synthetic zeolite or by combining an organophilic clay with a layer of water-swellable clay, such as bentonite, and applying a layer of the mixture of water-swellable clay with the zeolite or organophilic clay over a soil surface (not admixed therewith) to form a water-holding area, the water-swellable clay will expand upon hydration and the zeolite and/or organophilic clay combined with the water-swellable clay will form a water-treatment layer wherein the zeolite and/or organophilic clay will last many times longer than it would if the entire waste water supply were treated as in the prior art, since only that quantity of water will be treated that permeates the water-swellable clay.

In accordance with another important embodiment of the present invention, the contaminant removal or neutralizing layer, comprising any contaminant neutralizing or removal material can be supplied as a separate layer below the layer of water-holding material so that the amount of material treated for the removal of contaminants is only that material which completely permeates the water-holding layer, as shown in FIG. 2.

In accordance with another important advantage of the article of manufacture and process of the present invention, the volume of contaminated water held in a water-holding earthen structure, such as shown in FIGS. 1 and 2, will become increasingly concentrated in contaminants with time, as water evaporates from the water-holding area. When the water held in the water-holding area becomes so contaminated that the water-holding ability of the water-swellable clay is substantially reduced after a number of months or years, the entire water-holding area can be solidified, such as with a silicate cementing agent e.g., Common U.S. Pat. No. 3,837,872, hereby incorporated by reference, and cemented over and a new water-holding area formed with a clean contaminant removing layer and a clean water-swellable clay layer or other water-holding material layer and the process repeated. Alternatively, the concentrated, exceptionally contaminated water held in the water-holding area after a period of years can be pumped from the water-holding area and disposed of in any suitable landfill or treated on stream in a continuous process for removal of contaminants while the layers of contaminant-treating material, e.g., the zeolite and/or organophilic clay and the layer of water-holding material are removed and replaced.

In accordance with another important feature of the present invention, the contaminant neutralizing or removal material mixed with the water-swellable clay, as shown in FIG. 1, or supplied as a separate layer, as shown in FIG. 2, can be any material capable of adsorbing, absorbing, ion-exchanging, or reacting with the contaminants for removal, such as by insolubilization, or for neutralization while keeping the contaminant(s) water-soluble, in order to decrease the toxicity of or remove the contaminants so that the contaminants are not absorbed in the soil below the water-holding area.

Examples of materials capable of removing or neutralizing contaminants that are present in the water held in the water-holding areas of FIGS. 1 and 2 include absorbents, including absorbent fibers such as microcrystalline cellulose; attapulgite clay; zinc rincinoleate absorbed on an absorbent fiber or other absorbent or adsorbent material; amorphous silica powder; synthetic calcium silicate; polyolefin pulp; sodium alumino-silicate (e.g., sodium zeolites); maltodextran; sodium silica aluminates, and the like. Such absorbents can be utilized as a separate layer beneath the water-holding material layer, or can be mixed into the water-absorbent clay composition layer, preferably homogeneously. Other materials capable of removing or neutralizing contaminants include adsorbents, such as microcrystalline cellulose; silica hydrogel-based compositions; attapulgites; synthetic sodium magnesium silicates; synthetic calcium silicates; silicon dioxide; acid activated clays; carbon; activated carbons, e.g., activated charcoal; diatomaceous earth, Fuller's earth; zeolites; and the like. Like the absorbents and any other treatment materials, the adsorbents can be provided as a separate layer or mixed with the water-swellable clay layer. In order to make sure that ground water supplies are not contaminated by any water passing through the water-holding material layer and the layer of treatment material, an algicide, antimicrobial material, bactericide, disinfectant, and/or fungicide can be added to the treatment material layer so that harmful algae, bacteria or fungi do not reach ground water supplies. Suitable materials include phenol; zinc undecylenate N.F.; acetyl tyridinium chloride N.F.X.III, and the like.

Suitable ion-exchange materials include sulfonated polystyrene, cross-linked 1% to about 20%; sulfonated phenolic resins; phenol methylene sulfonic acid resin; cellulose alkyl sulfonic acid resins; sulfonated coal; cross-linked acrylic and methacrylic polymers and copolymers; phenolic phosphoric acid resins; aluminum silicate; zirconium phosphate; zirconium tungstate; zirconium molybdate; carboxylated celluloses, e.g., carboxymethyl cellulose; cross-linked trimethyl benzyl ammoniumpolystyrene matrix; e.g., cross-linked DOWEX and AMBERITE resins; dimethylhydroxyethyl-benzyl ammonium polystyrene, e.g., DOWEX and ZEOLEX; phenolic resin matrix condensation products, e.g., IMACS-3, LEWATIT MN and WOFATIT L165; aminopolystyrene; aminated polyacrylic polymers and copolymers; aminated phenolic resin condensation products, e.g., AMBERLITE IR-48, and DUOLITE A-7; epoxy polyamine resins; zirconium oxide gel; aminoethyl cellulose; diethylaminoethylcellulose; epoxy polyamines; amino polystyrene; and aminated phenolic resins, e.g., DUOLITE A-2.

Most preferred as the adsorbent, absorbent ion-exchange and/or reactant and/or neutralizing material are natural or synthetic zeolites and/or organophilic clays. Organophilic clay is basically a montmorillonite clay that has been reacted with a quaternary amine to make it hydrophilic and absorbent to organic contaminants.

The organophilic clays are well known in the art and the most widely used are the alkyl ammonium bentonites, alkylaryl ammonium bentonites and alkylaryl ammonium hectorites containing about 8 to about 32 carbon atoms in the alkyl chains and being either straight or branched chains. Polar activators sometimes called polar dispersants can be included with (absorbed by) the organophilic clays in an amount of about 10% to about 40% based on the dry weight of the organophilic clay to help separate clay platelets for better organic contaminant absorption. Suitable polar activators include acetone; aqueous methanol or aqueous ethanol, e.g., 75-98% by weight methanol or ethanol and 2-25% by weight water; and propylene carbonate. It is understood that any organophilic clay capable of absorbing organic contaminants contained in the pond, lagoon or other waste water containment area can be used as the organophilic clay in accordance with the principles of this embodiment of the present invention.

The zeolites useful in accordance with the present invention can be any zeolite capable of absorbing, adsorbing, reacting with or ion-exchanging with a contaminant in the water that reaches the zeolite layer. Generally, zeolites are used for their capability of ion-exchanging sodium from the zeolite for a heavy metal contained in waste water. For example, synthetic zeolite Na-A is excellent for removal of $Pb^{+2}$, $Ag^+$, $Cu^{+2}$, $Cd^{+2}$, $Zn^{+2}$, $Co^{+2}$, $Ni^{+2}$ and $Mn^{+2}$, in decreasing order of effectiveness. Synthetic zeolites Na—X and Na—Y are known for removal of $Cd^{+2}$ and $La^{+3}$.

Generally, Na, K, and/or Ca are used to enrich the natural zeolite for more effective ion-exchange and for more ion-exchange of more heavy metals. Natural zeolites, such as Na-exchanged clinoptilolte ($Na_6(AlO_2)_6\cdot(SiO_2)_{30}\cdot24\ H_2O$), also are capable of removing heavy metal ions according to the following order of decreasing efficiency: $Pb^{+2}$, $NH_4^+$, $Ba^{+2}$, $Cu^{+2}$, $Cd^{+2}$, $Sr^{+2}$, $Zn^{+2}$, $Co^{+2}$, $Ni^{+2}$ and $Hg^{+2}$. Other suitable natural zeolites and other natural clay minerals include tobermorites, hydroxyapetites, and the like.

Turning now to the drawings and initially to FIG. 1, there is illustrated one embodiment of the article of manufacture of the present invention, generally designated 10, disposed above a soil surface 13 and beneath a holding pond or lagoon 14 to prevent ground water contamination. The holding pond or lagoon 14 generally is formed as a depression in an earthen surface and may contain a layer of soil 16 directly beneath the contaminated liquid 18 to prevent rupture or other disturbance of the multi-layer article of manufacture of the present invention. The soil layer 16, however, generally is unnecessary in forming the holding pond or lagoon to prevent ground water contamination in accordance with the principles of the present invention. The article of manufacture 10 made in accordance with the principles of the present invention is designed to hold the contaminated liquid 18 within the pond or lagoon 14 such that less than $1\times10^{-7}$ centimeters per second flow through the article 10 to retain the contaminated water 18 within the lagoon 14 and to treat the contaminants that permeate the article 10 for neutralization or removal of the contaminants from the permeating water.

In accordance with the embodiment shown in FIG. 1, the article of manufacture 10 includes an upper layer of a substantially water-impermeable non-woven sheet material 20, such as a high density polyethylene, directly above a layer of contaminated treating material 22 such as a zeolite, an organophilic clay, and/or an ion-exchange resin, or the like, sandwiched between the upper water-impermeable layer 20 and a lower sheet of woven or non-woven textile material 24 that may be permeable or impermeable. The water-impermeable upper plastic sheet layer 20 is a water holding layer that permits $1\times10^{-7}$ centimeters per second or less of the contaminated water to pass therethrough and the layer of zeolite, organophilic clay, ion-exchange resin or other treating material 22 is designed to remove or neutralize the contaminants contained in the water that passes through the upper layer 20 so that its further penetration through the soil surface 13 and into the ground water will not contaminate the ground water supply. If desired, a water-swellable clay can be mixed into the treating material in layer 22 to prevent further penetration of the water through the lower textile layer 24 and, therefore, prevent its further penetration into the ground water supply.

As shown in another embodiment of the article of manufacture of the present invention in FIG. 2, a multi-layer article of manufacture, generally designated 12, includes an upper layer of woven or non-woven textile material 26 which may be water-permeable or water-impermeable, and a second layer of a water-swellable clay, such as bentonite 28, and a lower layer of contaminant-treating material 30 disposed directly beneath the layer of water-swellable clay 28. The layers of water-swellable colloidal clay 28 and the contaminant treating material 30 are held together with a lower layer of woven or non-woven textile material 32 and an optional intermediate layer of woven or non-woven textile material 34, where the textile materials 32 and 34 may be water-permeable or water-impermeable. The layer of water-swellable clay 28 will swell upon contact with water to provide a water holding layer and that portion of the contaminated water which passes through the clay layer 28 will be treated with the treating layer 30 for neutralization or removal of contaminants therefrom so that the water that passes completely through the article of manufacture 12 and into the ground water supply will not contaminate the water supply. If desired, an uppermost sheet of water-impermeable sheet material, such as high density polyethylene (not shown) can be applied on top of the textile material 26 to provide an additional or safety layer of water-impermeability.

FIG. 3 shows another embodiment of the multi-layer article of manufacture, generally designated 14 including an upper layer of woven or non-woven textile material 36 that can be water permeable or water-impermeable; a layer of water-swellable colloidal clay, such a bentonite 38, and, disposed below the clay layer 38, two layers of contaminant-treating materials for the purpose of neutralization or removal of two different contaminants contained in the contaminated water 18, such as a zeolite layer 40 and an organophilic clay layer 43. The water holding layer 38 and the contaminant-treating layers 40 and 42 are structurally held together with a lower layer of woven or non-woven textile material 44 with the optional intermediate layers of textile material 46 and 48 for manufacturing purposes. Any of the textile layers 36, 44, 46 and 48 can be either water-permeable or water-impermeable to further prevent the passage of water through the article of manufacture 14 and into ground water supplies.

In accordance with another important embodiment of the present invention, as shown in FIG. 4, the multilayer article of manufacture shown in any of FIGS. 1–3 can be applied in the environment of a tank farm so that any spills resulting from tanks, including materials which are undesirable in a ground water supply, can be neutralized or removed prior to their reaching the ground water 50 as shown in FIG. 4, the article of manufacture of FIG. 2, generally designated 12, is disposed beneath a four inch layer of stone 52 and above a layer of native soil 54 that separates the ground water supply 50 from the article of manufacture 12 of the present invention. Any spills that pass through the stone cover layer 52 and through an optional soil layer 56 will be held above the ground water supply by the article of manufacture 12 and any contaminated material that passes through the water holding layer 28 will be treated by the contaminant-treating material layer 30 for neutralization or removal of the contaminants before that water passes into the ground water supply 50.

Although the present invention has been described in terms of several preferred embodiments, it is intended to include those equivalent structures, some of which may be apparent upon reading this description, and others that may be obvious after study and review.

What is claimed and sought to be secured by Letters Patent of the United States is:

1. A water holding area for containment and treatment of contaminated water comprising an earthen depression capable of retaining water having a soil floor permeable to water; a contaminant-treating material comprising a structurally stable layer of treating material between fabric sheets, disposed above the soil floor, not in admixture with the soil, and capable of treating a contaminant in said water upon contact to reduce the concentration of the contaminant in said contacted water; and a layer of water-holding material disposed above the contaminant-treating material, said water-holding material comprising a structurally stable layer of water-holding material between two other fabric sheets, capable of allowing permeation of contaminated water therethrough at a predetermined rate for treatment by said contaminant-treating material.

2. A water holding area for containment and treatment of contaminated water comprising an earthen depression capable of retaining water having a soil floor permeable to water; a contaminant-treating material not in admixture with the soil, and capable of treating a contaminant in said water upon contact to reduce the concentration of the contaminant in said contacted water; and a layer of water-holding material, said water-holding material capable of allowing permeation of contaminated water therethrough at a predetermined rate for treatment by said contaminant-treating material, wherein the contaminant-treating material and the water-holding material comprise a multi-layer article of manufacture including a layer of contaminant-treating material and a layer of water-holding material having a layer of water-permeable sheet material therebetween, and wherein the multi-layer article of manufacture is located above the soil floor, with the water-holding layer above the treating layer.

3. A water holding area for containment and treatment of contaminated water comprising an earthen depression capable of retaining water having a soil floor permeable to water; a contaminant-treating material disposed above the soil floor, not in admixture with the soil, and capable of treating a contaminant in said water upon contact to reduce the concentration of the contaminant in said contacted water; and a layer of water-holding fabric sheet material disposed above the contaminant-treating material, said water-holding fabric sheet material capable of allowing permeation of contaminated water therethrough at a predetermined rate for treatment by said contaminant-treating material.

4. A water holding area for containment and treatment of contaminated water comprising an earthen depression capable of retaining water having a soil floor permeable to water; a contaminant-treating material disposed above the soil floor, not in admixture with the soil, and capable of treating a contaminant in said water upon contact to reduce the concentration of the contaminant in said contacted water; and a layer of water-holding fabric sheet material having a water permeability of $1 \times 10^{-7}$ cm/sec or less and disposed above the contaminant-treating material, said water-holding fabric sheet material capable of allowing permeation of contaminated water therethrough at a predetermined rate for treatment by said contaminant-treating material.

5. A method for containing contaminated water held in an earthen water-holding area and for treating water that permeates a water-holding material disposed proximate to a soil floor portion of the water-holding area for removal or neutralization of a contaminant therein comprising applying above the soil floor of the water-holding area a layer of a contaminant-treating material, prepared as a structurally stable layer of treating material between fabric sheets, and not admixed with the soil, capable of treating the contaminated water that penetrates a water-holding material to reduce the contaminant concentration of water that passes through the contaminant-treating material, and applying over the contaminant-treating material, a layer of a water-holding material, prepared as a structurally stable layer of water-holding material between two other fabric sheets, and capable of slowing the permeation of contaminated water through the soil floor.

6. A method for containing contaminated water held in an earthen water-holding area and for treating water that permeates a water-holding material disposed proximate to a soil floor portion of the water-holding area for removal or neutralization of a contaminant therein comprising applying above the soil floor of the water-holding area a layer of a contaminant-treating material, not admixed with the soil, capable of treating the contaminated water that penetrates a water-holding material to reduce the contaminant concentration of water that passes through the contaminant-treating material, and a layer of a water-holding material capable of slowing the permeation of contaminated water through the soil floor, including forming the contaminant-treating material and the water-holding material into a multi-layer article of manufacture including a layer of contaminant-treating material and a layer of water-holding material having a layer of water-permeable sheet material therebetween, and applying the multi-layer article of manufacture above the soil floor, with the water-holding layer above the treating layer.

7. A method for containing contaminated water held in an earthen water-holding area and for treating water that permeates a water-holding material disposed proximate to a soil floor portion of the water-holding area for removal or neutralization of a contaminant therein comprising applying above the soil floor of the water-holding area a layer of a contaminant-treating material, not admixed with the soil, capable of treating the contaminated water that penetrates a water-holding material to reduce the contaminant concentration of water that passes through the contaminant-treating material, and a layer of a water-holding material capable of slowing the permeation of contaminated water through the soil floor, including forming the contaminant-treating material and the water-holding material into a multi-layer article of manufacture including a layer of contaminant-treating material and a layer of water-holding material having a layer of water-permeable sheet material having a water permeability of $1 \times 10^{-7}$ cm/sec or less therebetween, and applying the multi-layer article of manufacture above the soil floor, with the water-holding layer above the treating layer.

* * * * *